Patented June 30, 1925.

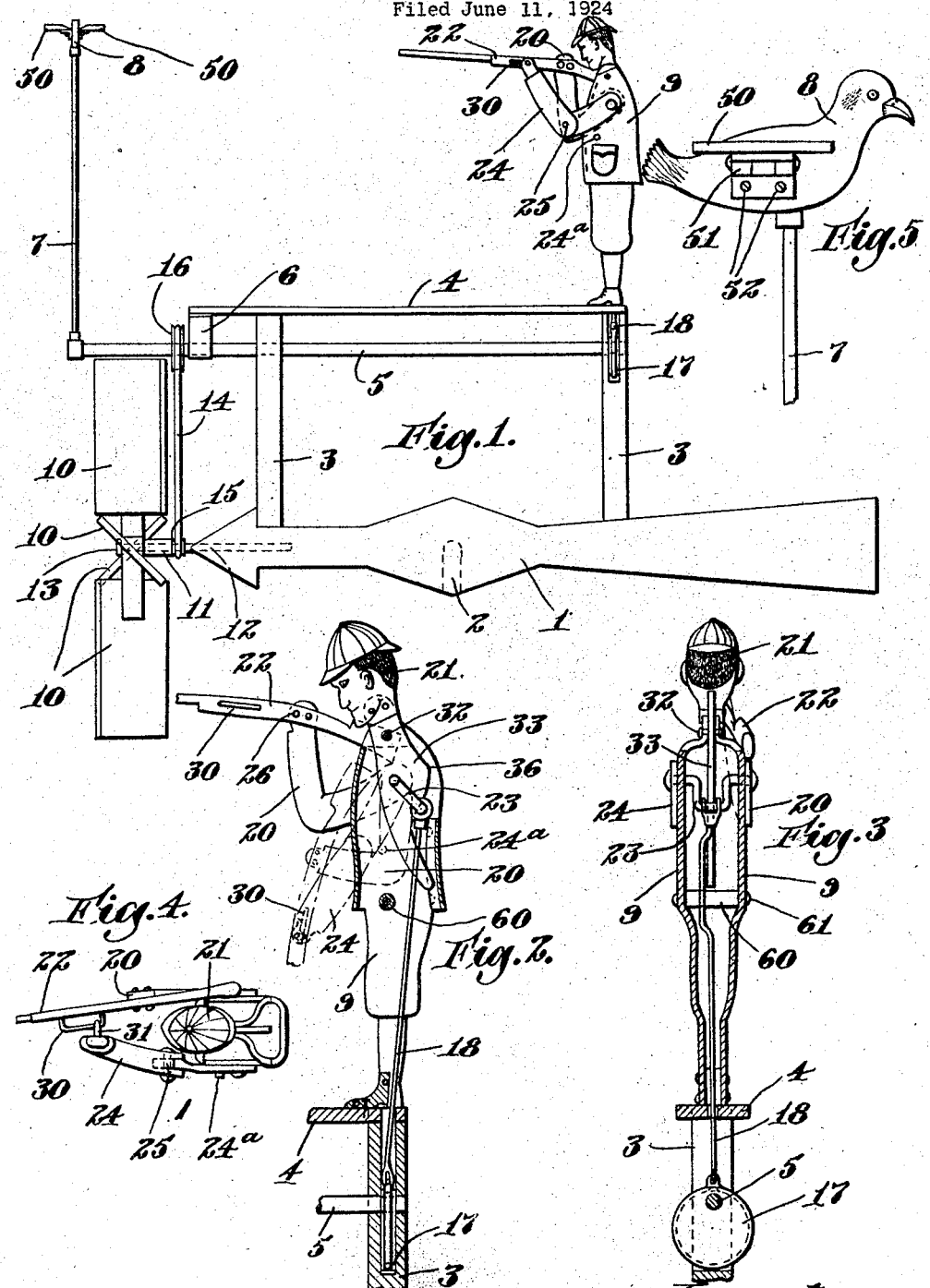

1,543,788

UNITED STATES PATENT OFFICE.

JOHN O. PARKER, OF EAST MARION, MASSACHUSETTS.

TOY.

Application filed June 11, 1924. Serial No. 719,323.

*To all whom it may concern:*

Be it known that I, JOHN O. PARKER, a subject of the King of Great Britain, and resident of East Marion, in the county of Plymouth and State of Massachusetts, have invented an Improvement in Toys, of which the following description, in connection with the accompanying drawings, is a specification, like reference characters on the drawings representing like parts.

My present invention relates to toys, and more particularly to a toy wherein appear two movable figures, preferably a hunter and quarry, such as a bird, rabbit, or the like, said two figures being operated in synchronism to simulate the shooting of the quarry by the hunter.

The object of my invention is to provide such a toy, which may be operated either by wind-impelled propellers, by motor, by hand crank or the like. There have been many toys devised to be operated by windmill or the like, but none, so far as I am aware to simulate the hunting action, as I have illustrated the same. In the accompanying drawings I have shown my device as applied to a windmill, wherein the moving parts are actuated by wind-impelled propellers.

In my present construction, the quarry, be it bird or beast, is attached to the general mechanism in such a way that it will be operated in synchronism with the movements of a figure at the opposite end of the device, which figure will preferably simulate the action of a hunter raising and sighting his gun, and after the simulation of shooting, will lower the same.

Further details of the invention, novel combinations of parts, and advantages, will be hereinafter more fully pointed out and claimed.

Referring to the drawings illustrating a preferred embodiment of my invention,

Fig. 1 illustrates a general side view of my invention as applied to a windmill;

Fig. 2 is a side view partly in cross-section of the operating mechanism for the hunter;

Fig. 3 is a rear view partly in cross-section of the human figure;

Fig. 4 is a top plan view of the human figure; and

Fig. 5 is a side view of the construction of bird, preferably used in my invention.

As shown in Fig. 1, I have applied my present invention to a windmill, comprising a body or supporting portion 1, which will be rotatably held on any desired object by means of a pin or the like, inserted in the aperture 2 provided therefor. On the supporting portion 1 are two uprights 3, supporting a platform 4. A rotating shaft 5 is provided under the platform 4, and partially supported by the bracket 6, to one end of which shaft is attached in any suitable manner a wire, rod or the like 7, said rod having on its outer end a figure representing a bird or animal 8. On the platform 4, at the opposite end of the device from the Figure 8 is another Figure 9, representing, in the present instance, a hunter. A set of windmill planes 10, 10, to operate the device are pivotally secured to the rod 11, which is inserted in the end 12 of the supporting portion 1, and held in position by any retaining means 13. A belt 14 for operating the device is fitted in a groove 15 in the pin 11, and around a driven pulley 16 on the outer end of the shaft 5. It will thus be seen that rotation of the planes 10 will operate the driving belt 14, and rotate the shaft 5. To the rear end of the shaft 5, in a suitable position, is secured an eccentric wheel 17, which eccentric wheel operates a wire or other means 18 for controlling the action of the human Figure 9, as will be hereinafter more fully described.

Referring to Fig. 2, the mechanism of the hunter will now be described. This figure comprises the general body portion 9, right arm 20, left arm 24, head 21, gun 22, and a crank shaft 23 for operating the head, arms, and gun simultaneously. In Fig. 2 the left arm 24 is shown in dotted lines with the gun in downward or relaxed position, and held against further depression by a stop pin or other means 24$^a$. The arm 24 is hinged, as shown at 25, so that this arm may flex with the raising and lowering of the gun. It is not necessary to joint the right arm, as this swings in the same plane at all times. The sides 9 of the human figure are held together by a brace or other securing means 60, which brace 60 is secured in position by headed rivets 61. The right arm 20 is secured to the gun by means of a pin or rivets 26. On the gun 22 is a slide 30, on which moves a ring, or the like 31, in the position generally occupied by the left hand. The head 21 is pivotally mounted on a pin 32 for oscillation forwardly and backwardly. The head 21 is extended downwardly in a flat member 33, so constructed and arranged as to co-operate with the crank shaft 23. As shown in Figs. 2 and 3, the crank shaft 23 is in its lowermost position, so that the gun and arms are raised, and the head lowered, simulating the action of a hunter sighting his gun, as graphically shown in Fig. 1. On rotation of the eccentric wheel 17, the crank shaft 23 will be moved upwardly by the controlling means 18, so that it will slip by the point 36 of the head mechanism, permitting the head to snap back to normal raised position. The arms 20 and 24 are rigidly secured to the crank shaft 23, so that when the crank shaft is in its lowermost position, as shown in Figs. 2 and 3, the arms and gun controlled thereby will be up, but when the crank shaft 23 is moved upwardly this will automatically throw the gun and arms downward to relaxed position simultaneous with the movement of the head to normal raised position.

I so construct and arrange my entire device that the wire 7, with the bird 8 on the outer end thereof, will be revolved in synchronism with the movements of the hunter, so that when the bird is approaching its uppermost position the gun is being raised, and as soon as the bird passes the front of the gun, and starts on its downward flight, the gun and arms and head of the hunter are snapped back to relaxed position, awaiting the arrival of the bird on its next revolution. It will thus be appreciated that no matter how fast the shaft 5, controlling the entire mechanism of my device, rotates, the action of the hunter shooting the bird will be automatically repeated as fast as it is possible to operate the device, and will thus present a most attractive, pleasing, and ornamental toy, whether it be used for windmill, weather vane, or for a mechanically operated toy.

In order to render the simulation of shooting the bird more graphic, I have provided a pair of wings 50, which wings are carried on hinges 51, operating from a position of 90° to a position of 180°. When the bird is in uppermost position, as shown in Fig. 1, the wings 50 will drop down to the 90° position, but when it has passed its vertical position, and is on its downward flight, the wings will drop by their own weight to the 180° position, thus simulating a bird which has been shot, and has dropped. The hinges 51 are secured to the bird 8 by screws or the like 52.

While I have necessarily been somewhat limited and constricted in my representation and illustration of characters on my present toy, it will be appreciated that my invention is not limited to the representation of a bird, or the like, as any other quarry may be illustrated. It will also be appreciated, that while I have described my device somewhat in detail, that I am not limited thereto, but may vary the size, shape and arrangement of parts within reasonably wide limits, without departing from the spirit of my invention. For example, while I have shown the preferred embodiment of my invention as operated by windmill planes, it will be appreciated that I may utilize power driving means, or a hand crank, or any other means for driving or operating the mechanism of my device.

My invention is further described and defined in the form of a claim as follows:

A toy of the kind described, comprising a support, upright standards on said support, carrying thereon a platform, a shaft carried by said standards, and having secured at one end thereof a bird or other quarry, a driven pulley carried by said shaft, and means on the support to rotate said shaft, a man-like figure on said platform opposite said bird or quarry, said man-like figure being provided with a head, arms, and a gun, all operable by means of an eccentric carried on said shaft, said human figure, and said bird or quarry, being operated in synchronism to simulate the action of a hunter shooting its quarry.

In testimony whereof, I have signed my name to this specification.

JOHN O. PARKER.